(12) United States Patent
Lee

(10) Patent No.: US 7,455,094 B2
(45) Date of Patent: Nov. 25, 2008

(54) APPARATUS AND METHOD FOR MANUFACTURING AGRICULTURAL WATER SUPPLY HOSE

(75) Inventor: Jong-Won Lee, Seoul (KR)

(73) Assignee: Seo Won Co., Ltd., Puchon ( * ) Notice: Subject to any disclaimer, the term of this patent is extended or adjusted under 35 U.S.C. 154(b) by 260 days.

(21) Appl. No.: 11/379,116

(22) Filed: Apr. 18, 2006

(65) Prior Publication Data

US 2007/0240785 A1    Oct. 18, 2007

(51) Int. Cl.
*B29C 47/02* (2006.01)
*B05B 15/00* (2006.01)

(52) U.S. Cl. ........................... 156/500; 156/552

(58) Field of Classification Search ............ 156/244.12, 156/244.13, 500, 552; 239/542; 118/254; 427/230
See application file for complete search history.

(56) References Cited

U.S. PATENT DOCUMENTS 6,280,554 B1 *  8/2001  Lambert et al. ........ 156/244.12

2003/0057301 A1 *  3/2003  Cohen .................... 239/542

* cited by examiner

*Primary Examiner*—Jeff H Aftergut
*Assistant Examiner*—Jaeyun Lee
(74) *Attorney, Agent, or Firm*—Arent Fox LLP

(57) ABSTRACT

Disclosed therein are apparatus and method for manufacturing agricultural water supply hose, which can continuously supply a small quantity of water to various farm products or agricultural crops such as garden fruits. The apparatus and method can firmly bond the nozzle chips on the hose without regard to materials and constituents of the nozzle chips not by thermally bonding the nozzle chips on the inner periphery of the hose but by bonding the nozzle chips on the inner periphery of the hose after coating the inner periphery of the hose with an adhesive which is supplied from an adhesive coating device, thereby increasing durability. The apparatus and method can prevent distortion of the bonded portion and concentration of stress on the bonded portion even though the coefficients in thermal expansion of the nozzle chips and the hose are different from each other since the bonding between the nozzle chips and the hose is carried out after the hose is sufficiently cooled from a melting point. The apparatus and method can supply the nozzle chips up to a place, where the nozzle chips will be bonded, in such a way that the nozzle chips supplied from a bowl feeder is supplied forwardly by constant-speed rollers and then supplied to a portion, which will be bonded, by chip inputting rollers rotating rapidly, thereby supplying the nozzle chips more easily and conveniently.

7 Claims, 4 Drawing Sheets

APPARATUS AND METHOD FOR MANUFACTURING AGRICULTURAL WATER SUPPLY HOSE

BACKGROUND OF THE INVENTION

1. Field of the Invention

The present invention relates to apparatus and method for manufacturing agricultural water supply hose, which can continuously supply a small quantity of water to various farm products or agricultural crops such as garden fruits, and more particularly, to apparatus and method for manufacturing agricultural water supply hose, which can bond nozzle chips on the inner periphery of the hose during an extrusion process of the hose using an adhesive supplied from an adhesive coating nozzle connected to an adhesive coating device, thereby firmly bonding the nozzle chips on the hose, and easily bonding the nozzle chips on the hose even though the nozzle chips are made of a material different from that of the hose.

2. Background Art

In general, water necessary for cultivating farm products such as vegetables or garden products such as flowers, garden trees, and fruits in a farm is supplied through a water pump or a water supply facility such as a sprinkler.

However, the method for supplying water using the water pump has several disadvantages in that it is inconvenient to supply water since the water pump of heavy weight must be moved to a wanted place to supply water, and in that it is uneconomical in cultivation of farm products due to a great deal of consumption of manpower cost and water.

Moreover, the method for supplying water using the sprinkler has several disadvantages in that manpower cost is low but production cost of farm products is increased due to excessive power rates since it requires the great cost of equipment and the high water pressure, and in that it causes a great deal of consumption of water during water supply.

Therefore, it has been judged that a method for supplying water through a hose while water drops in drips in a sufficiently decompressed state is more benefit than the method for spraying water through the sprinkler.

To discharge water in the decompressed state, the hose includes a number of water discharge holes of fine diameter, or water is discharged after passing through a porous fiber.

FIG. 7 is an exemplary view of an agricultural water supply hose. In FIG. 7, the hose 7 has nozzle chips 10 longitudinally combined on the inner periphery thereof at regular intervals, and each nozzle chip 10 has a fine flow passageway and a hole 22 formed thereon, whereby water can drop in drips in the sufficiently compressed state since water passing through the fine flow passageway by the internal pressure of the hose is discharged to the outside through the hole 22.

There is a conventional method for manufacturing a series of agricultural water supply hose during an extrusion process. The conventional method has an advantage in that bonding is achieved easily since the nozzle chip is thermally bonded on the inner periphery of the hose using heat generated during the extrusion process, but has several disadvantages in that a bonded state is bad and in that the nozzle chip is not bonded on the hose if a material of the nozzle chip is different from that of the hose.

FIG. 8 is a brief view of a conventional apparatus for manufacturing an agricultural water supply hose. In FIG. 8, the hose manufacturing apparatus includes: an extruder 101 for melting a plastic material and extruding it into a tube form through a die 102; a cooler 109 for cooling a hose extruded in a desired diameter through an extruding head 108 by an air-cooling type or a water-cooling type method; a chip carrier 103 for supplying nozzle chips 105 to the inner upper periphery of the hose extruded passing through the die 102; chip carrying means 107 for carrying the nozzle chips 105, which are loaded on a chip stack 104, to the chip carrier 103 by a pusher 106; a punching machine 111 for perforating a water discharge hole at a place of the hose corresponding to the nozzle chip 105 in a state where the nozzle chip 105 is bonded on the upper portion of the inner periphery of the hose; a hauler 112 for pulling the punched hose 110; and a winder 113 for winding the hose 110 passing through the hauler 112.

In the conventional agricultural water supply hose manufacturing apparatus, the nozzle chips 105 are piled up one by one in order to a height of the chip carrier 103 in a state where the nozzle chips 105 are piled up on the chip stack 104. The nozzle chips 105 piled up to the height of the chip carrier 103 are supplied to the front end of the chip carrier 103 by the chip carrying means 107 located in front of the nozzle chips 105. The nozzle chips 105 are supplied till they touch the inner upper periphery of the hose extruded in the die 102 since the rear end of the chip carrier 103 extends near to the extruding head 108 after passing through the die 102. At this time, the hose is thermally bonded with the nozzle chips 105 when the nozzle chips 105 touch the inner periphery of the hose since the hose is in a semi-melted state by heat applied when the hose is extruded.

The conventional method has an advantage in that bonding is achieved easily since the nozzle chips are thermally bonded on the inner periphery of the hose using heat applied during the extrusion process, but has several disadvantages in that a bonded state is bad and in that the nozzle chips are not bonded on the hose if a material of the nozzle chips is different from that of the hose.

That is, the bonded state between the hose 110 and the nozzle chips 105 may be varied according to temperature and cooling conditions when the plastic material is extruded. Particularly, if the nozzle chips 105 are not made of synthetic resin material or melting points are greatly different from each other, since the bonded state of the nozzle chips 105 on the inner periphery of the hose is not good only by heat applied when the nozzle chips 105 are extruded, the bonding of the nozzle chips is bad or the bonded nozzle chips may be separated from the hose.

Moreover, the bonding between the nozzle chips 105 and the hose 110 is achieved at a temperature similar to the temperature of the melting point of the synthetic resin material. So, the bonded portion is easy to be pulled or contracted after it is cooled when the coefficients in thermal expansion are different from each other due to different constituents even though the nozzle chips 105 and the hose 110 are made of the same plastic material, so that the hose may be damaged since stress and fatigue may be applied to the bonded portion during use, the outward appearance of the hose may be deteriorated, and durability is lowered.

SUMMARY OF THE INVENTION

Accordingly, the present invention has been made to solve the above disadvantages of the prior arts, and it is an object of the present invention to provide apparatus and method for manufacturing agricultural water supply hose that nozzle chips and the hose can be firmly bonded with each other without regard to materials and constituents of the nozzle chips not by thermally bonding the nozzle chips on the inner periphery of the hose but by bonding the nozzle chips on the inner periphery of the hose after coating the inner periphery of the hose with an adhesive which is supplied from an adhesive coating device, thereby increasing durability.

It is another object of the present invention to provide apparatus and method for manufacturing agricultural water supply hose that a bonded portion between the nozzle chips and the hose is not twisted or stress is not concentrated on the bonded portion even though the coefficients in thermal expansion of the nozzle chips and the hose are different from each other since the bonding between the nozzle chips and the hose is carried out after the hose is sufficiently cooled from a melting point.

It is a further object of the present invention to provide apparatus and method for manufacturing agricultural water supply hose that the nozzle chips are supplied in such a way that the nozzle chips supplied from a bowl feeder is supplied forwardly by constant-speed rollers and then supplied to a portion, which will be bonded, by chip inputting rollers rotating rapidly, thereby supplying the nozzle chips more easily and conveniently.

To this end, according to the present invention, the agricultural water supply hose can be manufactured by the steps of extruding the hose, cooling the hose passing through a vacuum tank, coating the adhesive, which is supplied by the adhesive supplier, on the upper portion of the inner periphery of the cooled hose, and bonding the nozzle chips supplied by the constant-speed rollers and the chip inputting rollers on the adhesive coated portion of the inner periphery of the hose when the adhesive is coated on the inner periphery of the hose.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
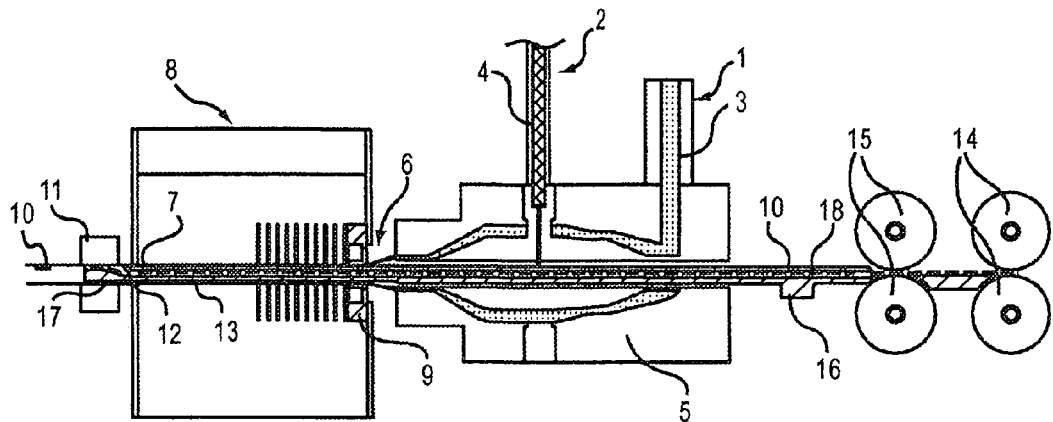
FIG. 1 is a brief view of an apparatus for manufacturing an agricultural water supply hose according to the present invention.
Figure 2:
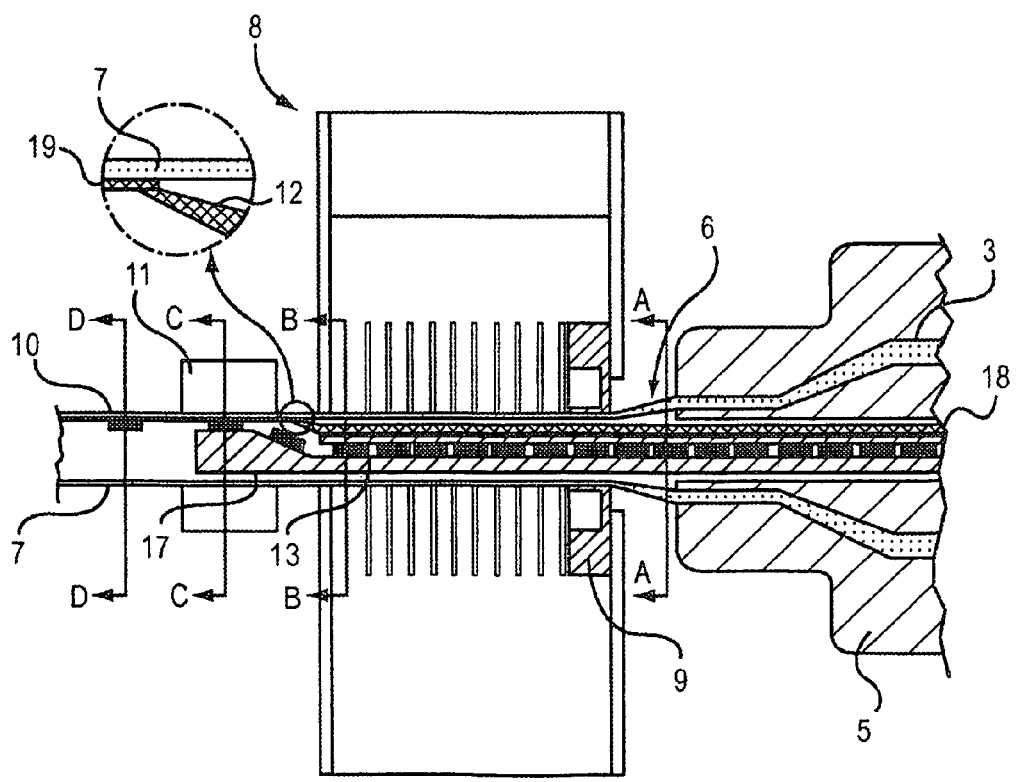
FIG. 2 is an enlarged view showing a bonding process of nozzle chips according to the present invention.

FIG. 1 is a brief view of an apparatus for manufacturing an agricultural water supply hose according to the present invention, and FIG. 2 is an enlarged view showing a bonding process of nozzle chips according to the present invention.

Here, the apparatus for manufacturing the agricultural water supply hose, in which nozzle chips 10 are bonded on the inner upper periphery of the hose 7 in a longitudinal direction, includes: means for supplying the nozzle chips 10; an extruder 1 for extruding the hose 7 through a die 5 after melting a plastic material 3; a vacuum tank 8 for cooling the extruded hose 7; and means for bonding the nozzle chips 10 onto the inner upper periphery of the hose 7.

The means for supplying the nozzle chips 10 are constant-speed rollers 14 and chip inputting rollers 15, and they are located in front of the extruder 1. The constant-speed rollers 14 and the chip inputting rollers 15 receive the nozzle chips 10 from a bowl feeder and a line feeder (not shown), and supply the nozzle chips 10 into the extruder 1 through a guide rod 16 located in front of the constant-speed rollers 14 and the chip inputting rollers 15.

The bowl feeder and the line feeder (not shown) are the same as the prior arts. The bowl feeder is classified into a conical form, a cylindrical form, and a plate form, and serves to supply materials to the line feeder by vibration of a vibrator. The line feeder serves to supply the materials supplied from the bowl feeder in one direction while keeping a leveled uniform state.

The nozzle chips 10 supplied from the bowl feeder and the line feeder are supplied between the two constant-speed rollers 14 shown in FIG. 1, and the constant-speed rollers 14, which are respectively located on the upper surface and the lower surface of the nozzle chips 10 and rotated in a surface-contacting state with each other, are moved in a tangential direction by friction force when the nozzle chips 10 are supplied between the constant-speed rollers 14.

The chip inputting rollers 15 are located in front of the constant-speed rollers 14. Also, the chip inputting rollers 15, which are rotated in a surface-contacting state with each other, are moved in the tangential direction by friction force when the nozzle chips 10 are supplied between the chip inputting rollers 15. At this time, a rotating speed of the chip inputting rollers 15 is set to be faster than that of the constant-speed rollers 14.

Therefore, the nozzle chips 10 slowly supplied by the constant-speed rollers 14 are rapidly supplied while passing through the chip inputting rollers 15, whereby the nozzle chips 10 passing through the chip inputting rollers 15 push the previously supplied nozzle chips 10 forwardly since the nozzle chips 10 are collided with the previously supplied nozzle chips 10.

At this time, shock applied to the previously supplied nozzle chips 10 can be controlled by controlling a relative rotational speed of the constant-speed rollers 14 and the chip inputting rollers 15.

That is, in order to more strongly supply the nozzle chips 10 which will be supplied forwardly through the guide rod 16, the relative rotational speed of the chip inputting rollers 15 to the constant-speed rollers 14 must be increased, but to slowly supply the nozzle chips 10, the relative rotational speed of the chip inputting rollers 15 to the constant-speed rollers 14 must be decreased.

Meanwhile, since the guide rod 16 is located in front of the chip inputting rollers 15, the nozzle chips 10 passing through the chip inputting rollers 15 are inserted into the guide rod through a through hole formed at a side end of the guide rod, and then, are supplied forwardly in a line.

The guide rod 16 is elongated forwardly, and is located in such a way as to direct toward the inside of the hose 7 extruded by passing through the center of the die 5 of the extruder 1.

Figure 3:
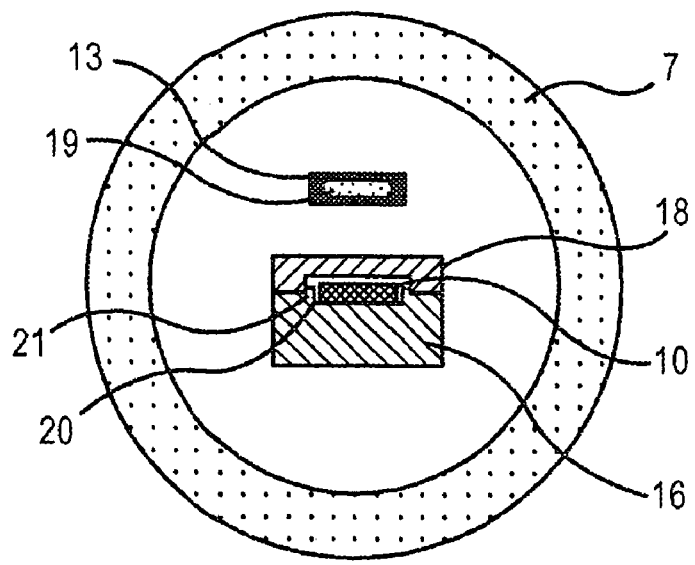
FIG. 3 is a sectional view taken along the line of A-A of FIG. 2.
Figure 4:
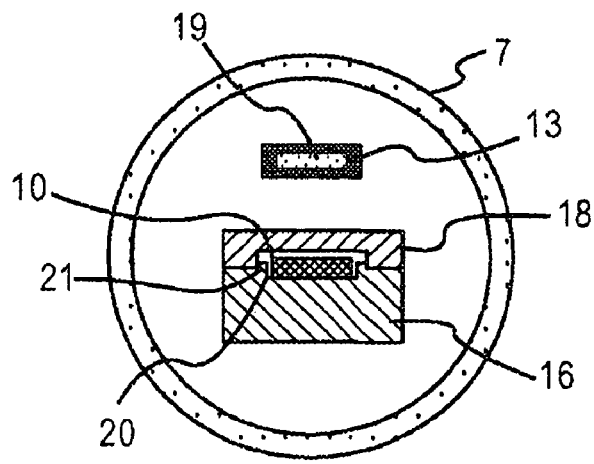
FIG. 4 is a sectional view taken along the line of B-B of FIG. 2.
Figure 5:
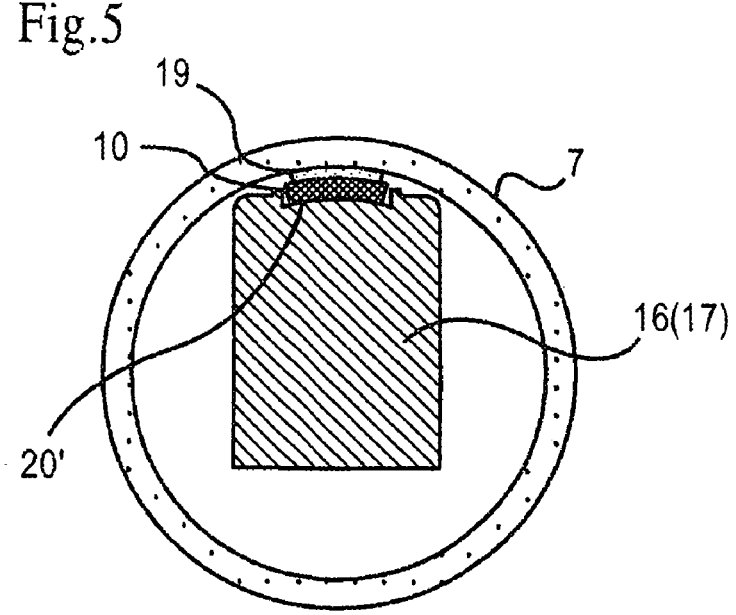
FIG. 5 is a sectional view taken along the line of C-C of FIG. 2.

As shown in FIGS. 3 to 5, to supply the nozzle chips forwardly in a line, the guide rod 16 has a groove 20 formed thereon having the same length as the guide rod 16 and a height and a width corresponding to a size of the nozzle chip 10, and a cover 18 is located on the groove 20 so that the nozzle chips 10 are not separated from the groove 20 during conveyance of the nozzle chips 10.

Furthermore, to exactly couple the cover 18 with the guide rod 16, the guide rod 16 may have a stepped jaw 21 elongatedly formed in a longitudinal direction of the guide rod 16.

Meanwhile, the guide rod 16 includes an inclined groove 17 upwardly inclined at the other end thereof, so that the nozzle chips 10 passing through the guide rod 16 can be discharged out through an opening formed at the other end thereof along the inclined groove 17 one by one. The cover 18 is formed up to a position located in front of the inclined groove 17 so as to prevent interference when the nozzle chips 10 are discharged out from the guide rod 16.

The plastic material 3 is melted in the extruder 1 and extruded through the die 5, and so, the hose 7 is extruded into a desired diameter while passing through an extruding head 6 and a flange 9.

As described above, the extruded hose 7 is cooled by a water-cooling type or an air-cooling type method while the hose 7 passes through the vacuum tank 8, and the cooled hose 7 is heated by a heating part 11 located in front of the vacuum tank 8 as high as it can be easily bonded by an adhesive.

Meanwhile, the front end portion of the guide rod 16 extends to a position where the heating part 11 is located and is upwardly inclined by the inclined groove 17, and the front end of the guide rod 16 is located as high as it can touch the inner upper periphery of the hose 7.

The apparatus for manufacturing the agricultural water supply hose according to the present invention includes an adhesive coating device 2 for coating the nozzle chips 10 on the inner periphery of the hose 7. As shown in FIGS. 1 and 2, the adhesive coating device 2 includes: an adhesive storage 4 containing liquid type adhesive therein; a supply tube 13 connected with the adhesive storage 4 and extending to the inside of the extruded hose 7 after passing through the die 5; and a coating nozzle 12 connected to an end of the supply tube 13 and directing toward the inner upper periphery of the hose 7 in rear of the heating part 11.

Here, the adhesive is a high-temperature adhesive, and a silicon-based adhesive is mainly used, but adhesives of other constituents may be used.

The adhesive 19 is supplied after passing through the die 5 of the extruder 1 through the supply tube 13. At this time, since the adhesive of low viscosity lowered by the internal temperature is supplied, the adhesive can be supplied well without stopping even though the supply tube 13 is thin.

The adhesive coating nozzle 12 is upwardly inclined from the supply tube 13, and the end of the adhesive coating nozzle 12 directs to the inner upper periphery of the hose 7.

Therefore, as shown in FIG. 2, the adhesive 19 flowing out from the adhesive coating nozzle 12 is coated on the inner upper periphery of the hose 7, and then, coated on the entire length of the inner upper periphery of the hose 7 while the hose 7 is continuously extruded.

At this time, the viscosity of the adhesive 19 may be increased since the adhesive 19 is deprived of heat while passing through the supply tube 13. However, since the heating part 11 is located in front of the supply tube 13, the hose 7 is sufficiently heated as good as the adhesive is bonded on the inner upper periphery of the hose when the hose 7 passes through the heating part 11, whereby the nozzle chips 10 are firmly bonded on the hose 7 by the adhesive 19 when the nozzle chips 10 touch the inner upper periphery of the hose 7 after being discharged out from the inclined groove 17 of the guide rod 16.

The heating temperature of the heating part 11 should be set according to the melting temperature of the adhesive, for example, it is preferable that the heating temperature is about 180□ when silicon-based adhesive is used.

The nozzle chips 10 are bonded on the hose 7 inside the heating part 11. At this time, the nozzle chips 10 are heated in the heating part 11 at temperature still lower than an extrusion temperature after the guide rod 16 and the hose 7 are cooled while passing through the vacuum tank 8, whereby the bonded portion is not transformed by twisting or stress is not concentrated on the bonded portion even though the nozzle chips 10 are cooled after being coupled to the hose 7.

Additionally, in the present invention, the nozzle chips 10 are bonded on the hose 7 not by a thermal melting but by the adhesive 19 with no melting of the nozzle chips 10, whereby nozzle chips 10 can be bonded on the hose even though the nozzle chips 10 are not made of the same synthetic resin material as the hose 7. So, a selection range of materials for the nozzle chips 10 is widened.

Figure 7:
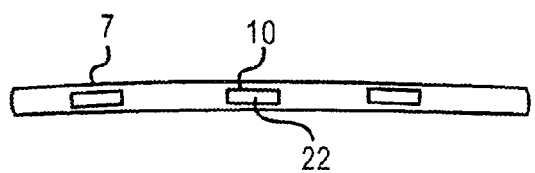
FIG. 7 is a perspective view of the agricultural water supply hose manufactured by the apparatus according to the present invention.

As described above, while the nozzle chips 10 are bonded on the inner upper periphery of the hose 7 by the adhesive 19, since the hose 7 is continuously extruded and the nozzle chips 10 are supplied in a speed equal to the extruding speed through the guide rod 16 and the inclined groove 17, the nozzle chips 10 are bonded on the hose at regular intervals in the longitudinal direction of the hose (see FIG. 7).

Figure 8:
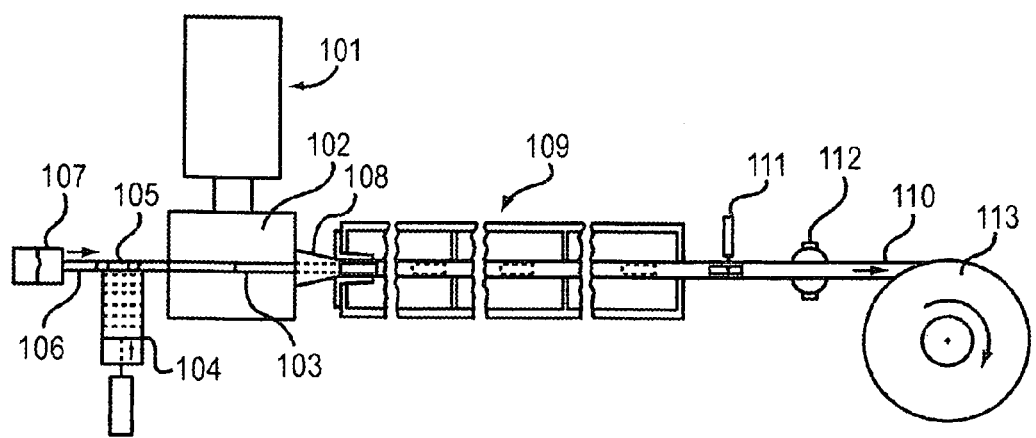
FIG. 8 is a brief view of a conventional apparatus for manufacturing an agricultural water supply hose.

When the nozzle chips 10 are bonded on the hose 7, as shown in FIG. 8 which shows the conventional agricultural water supply hose manufacturing apparatus, a water discharge hole 22 is formed on the center of the nozzle chip 10 when the nozzle chip passes through a punching machine 111. The nozzle chips 10 are continuously pulled forwardly by a hauler 112, and finally, the finished hose is wound on a winder 113 for packing.

Figure 6:
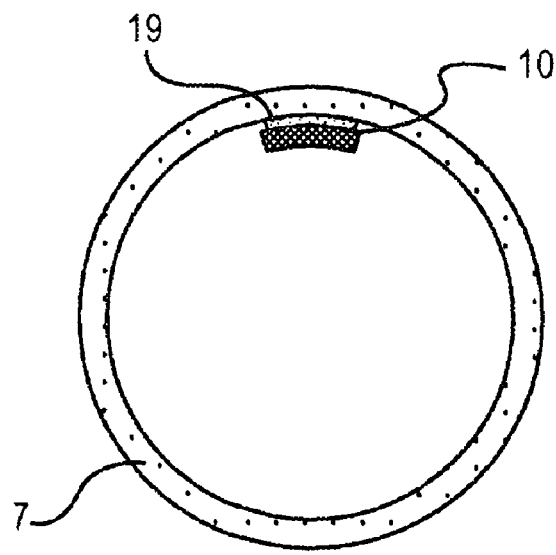
FIG. 6 is a sectional view taken along the line of D-D of FIG. 2.

Meanwhile, FIG. 3 is a sectional view taken along the line of A-A of FIG. 2, FIG. 4 is a sectional view taken along the line of B-B of FIG. 2, FIG. 5 is a sectional view taken along the line of C-C of FIG. 2, and FIG. 6 is a sectional view taken along the line of D-D of FIG. 2.

Referring to FIGS. 3 and 4, the adhesive supply tube 13 and the guide rod 16 are positioned at the location of the extruding head 6 and the vacuum tank 8 in a uniform height. A diameter and a thickness of the hose 7 are relatively larger at the location of the extruding head 6 since the hose 7 is in a state before it is inserted into the flange 9.

Meanwhile, FIG. 5 is a sectional view showing a state where the nozzle chips 10 are being bonded on the inner upper periphery of the hose 7. The front end of the guide rod 16 is located as high as it contacts with the inner upper periphery of the hose through the inclined groove 17, and the upper surface of the nozzle chip 10 supported by a groove 20' is in contact with the inner upper periphery of the hose 7 and bonded on the inner upper periphery of the hose 7 by the adhesive 19 located between the nozzle chip 10 and the hose 7.

At this time, the inner periphery of the hose 7 is arc-shaped, and so, the groove 20' formed at an inlet end of the guide rod 16 is also arc-shaped in the same way as the inner periphery of the hose 7.

As shown in FIG. 6, the bonded nozzle chips 10 are firmly bonded on the inner upper periphery of the hose 7 by the adhesive 19.

As described above, the present invention can firmly bond the nozzle chips on the hose without regard to materials and constituents of the nozzle chips not by thermally bonding the nozzle chips on the inner periphery of the hose but by bonding the nozzle chips on the inner periphery of the hose after coating the inner periphery of the hose with an adhesive which is supplied from an adhesive coating device, thereby increasing durability.

Furthermore, the present invention can prevent distortion of the bonded portion and concentration of stress on the bonded portion even though the coefficients in thermal expansion of the nozzle chips and the hose are different from each other since the bonding between the nozzle chips and the hose is carried out after the hose is sufficiently cooled from a melting point.

Moreover, the present invention can supply the nozzle chips up to a place, where the nozzle chips will be bonded, in such a way that the nozzle chips supplied from a bowl feeder is supplied forwardly by constant-speed rollers and then supplied to a portion, which will be bonded, by chip inputting rollers rotating rapidly, thereby supplying the nozzle chips more easily and conveniently.

While the present invention has been described with reference to the particular illustrative embodiments it is not to be restricted by the embodiment but only by the appended claims. It is to be appreciated that those skilled in the art can change or modify the embodiment without departing from the scope and spirit of the present invention.

What is claimed is:

1. An apparatus for manufacturing an agricultural water supply hose, which includes means for supplying nozzle chips, an extruder for extruding the hose through a die after melting a plastic material, a vacuum tank for cooling the extruded hose, and means for bonding the nozzle chips onto the inner upper periphery of the hose, wherein the means for supplying the nozzle chips is a guide rod longitudinally elongated inside the extruded hose in such a way as to pass through the die of the extruder and the vacuum tank, wherein the means for bonding the nozzle chips on the inner upper periphery of the hose is an adhesive coating device having an adhesive storage and a supply tube, the supply tube having an end portion connected with the adhesive storage and the other end portion having an adhesive coating nozzle, and wherein the adhesive coating nozzle is located in such a way as to coat an adhesive on the inner upper surface of the hose, an inclined groove is upwardly inclined at the front end portion of the guide rod so that the nozzle chips can be bonded on the inner upper periphery of the hose at regular intervals, and the nozzle chips 10 discharged from the guide rod are bonded on the inner upper periphery of the hose by the adhesive.

2. An apparatus for manufacturing an agricultural water supply hose according to claim 1, further comprising a heating part mounted in front of the vacuum tank for heating the hose, wherein the adhesive coating nozzle is located in rear of the heating part, so that the extruded hose is inserted into the heating part in a state where the inner upper periphery of the hose is coated with the adhesive and an end portion of the guide rod having the inclined groove is located inside the heating part, whereby the nozzle chips are bonded on the inner upper periphery of the hose after the adhesive is heated in the heating part.

3. An apparatus for manufacturing an agricultural water supply hose according to claim 1 or 2, wherein the nozzle chips are supplied to the guide rod after passing between two constant-speed rollers and two chip inputting rollers in order, the two constant-speed rollers being rotated in contact with each other and the two chip inputting rollers being rotated in contact with each other, the chip inputting rollers being rotated faster than the constant-speed rollers.

4. An apparatus for manufacturing an agricultural water supply hose according to claim 1 or 2, wherein the guide rod has a groove 20 formed through the entire length thereof and having height and width corresponding to a size of the nozzle chip so as to forwardly supply the nozzle chips in a line, and a cover is coupled to the top of the groove to prevent separation of the nozzle chips from the groove during conveyance of the nozzle chips.

5. An apparatus for manufacturing an agricultural water supply hose according to claim 1 or 2, wherein the supply tube of the adhesive coating device extends into the hose after passing through the die.

6. An apparatus for manufacturing an agricultural water supply hose according to claim 1 or 2, wherein the adhesive is a silicon-based high temperature adhesive.

7. An apparatus for manufacturing an agricultural water supply hose according to claim 2, wherein a heating temperature of the heating part is lower than a melting temperature of the nozzle chip but higher than a melting temperature of the adhesive.

* * * * *